(12) United States Patent
Döring et al.

(10) Patent No.: US 10,077,701 B2
(45) Date of Patent: Sep. 18, 2018

(54) CATALYST UNIT AND EXHAUST GAS CATALYST

(71) Applicant: MAN DIESEL & TURBO SE, Augsburg (DE)

(72) Inventors: Andreas Döring, Unterhaching (DE); Richard Losher, Krumbach (DE)

(73) Assignee: MAN Energy Solutions SE, Augsburg (DE)

( * ) Notice: Subject to any disclaimer, the term of this patent is extended or adjusted under 35 U.S.C. 154(b) by 66 days.

(21) Appl. No.: 15/326,354

(22) PCT Filed: Jul. 23, 2015

(86) PCT No.: PCT/EP2015/001520
§ 371 (c)(1),
(2) Date: Jan. 13, 2017

(87) PCT Pub. No.: WO2016/012097
PCT Pub. Date: Jan. 28, 2016

(65) Prior Publication Data
US 2017/0204768 A1    Jul. 20, 2017

(30) Foreign Application Priority Data

Jul. 25, 2014   (DE) ........................ 10 2014 010 858

(51) Int. Cl.
*F01N 3/28* (2006.01)
*B01D 53/94* (2006.01)
(Continued)

(52) U.S. Cl.
CPC ....... *F01N 3/2828* (2013.01); *B01D 53/9418* (2013.01); *B01J 35/04* (2013.01);
(Continued)

(58) Field of Classification Search
None
See application file for complete search history.

(56) References Cited

U.S. PATENT DOCUMENTS 7,638,039 B2   12/2009  Schirmer et al.
7,794,815 B2    9/2010  Ohno et al.
(Continued)

FOREIGN PATENT DOCUMENTS

DE   112004000457   4/2006
EP       2042636    4/2009
(Continued)

OTHER PUBLICATIONS

Office Action dated Dec. 4, 2017 which issued in the corresponding Japanese Patent Application No. 2017-500354.
(Continued)

*Primary Examiner* — Walter D. Griffin
*Assistant Examiner* — Jelitza M Perez
(74) *Attorney, Agent, or Firm* — Cozen O'Connor

(57) ABSTRACT

A catalyst unit includes: a ceramic catalyst body through which exhaust gas flows and having a substantially cuboid contour with a substantially rectangular inflow side and a substantially rectangular outflow side; a housing that at least partially encloses the catalyst body, and at least one bearing mat positioned in a gap formed between the catalyst body and the housing. Borders or edges of the catalyst body, which delimit the inflow side and the outflow side, each have dimensions of between 210 mm and 280 mm. The gap between the catalyst body and the housing, seen perpendicularly to the throughflow direction of the catalyst body, has a dimension determined according to the following relationship: s≤p*5, s being the dimension of the gap in mm and p the dimensionless amount of the density of the or each bearing mat expressed in kg/m2.

15 Claims, 2 Drawing Sheets

(51) Int. Cl.
  *F01N 3/20* (2006.01)
  *F01N 13/00* (2010.01)
  *B01J 35/04* (2006.01)

(52) U.S. Cl.
  CPC ......... *F01N 3/2066* (2013.01); *F01N 3/2853* (2013.01); *F01N 13/017* (2014.06); *B01D 2255/70* (2013.01); *F01N 2330/48* (2013.01); *F01N 2350/02* (2013.01)

(56) References Cited

U.S. PATENT DOCUMENTS

| | | |
|---|---|---|
| 7,972,464 B2 | 7/2011 | Saiki |
| 2006/0193756 A1 | 8/2006 | Suzuki et al. |
| 2007/0004593 A1 | 1/2007 | Ohno et al. |
| 2009/0084268 A1 | 4/2009 | Saiki |
| 2011/0030355 A1 | 2/2011 | Gilmo |
| 2014/0147342 A1 | 5/2014 | Hirose et al. |
| 2015/0037222 A1 | 2/2015 | Hikazudani et al. |

FOREIGN PATENT DOCUMENTS

| | | |
|---|---|---|
| EP | 2735368 | 5/2014 |
| EP | 2818241 | 12/2014 |
| EP | 2902601 | 8/2015 |
| JP | 04-342819 | 11/1992 |
| JP | 07-19036 | 1/1995 |
| JP | 09-220480 | 8/1997 |
| JP | 2004-315346 | 11/2004 |
| JP | 2009-056410 | 3/2009 |
| JP | 2009-085093 | 4/2009 |
| JP | 2013-163160 | 8/2013 |
| JP | 2013-169524 | 9/2013 |
| JP | 2014-058908 | 4/2014 |
| JP | 2014-066219 | 4/2014 |
| JP | 2014-104421 | 6/2014 |
| KR | 20080002918 | 1/2008 |
| KR | 20090032919 | 4/2009 |
| KR | 20120130251 | 11/2012 |
| WO | WO 2007/000847 | 1/2007 |
| WO | WO 2009/032191 | 3/2009 |
| WO | WO2014/050179 A1 | 4/2014 |

OTHER PUBLICATIONS

Office Action dated Apr. 2, 2018 which issued in the corresponding Japanese Patent Application No. 2017-500354.
Office Action and an English translation dated Apr. 19, 2018 which issued in the corresponding Korean Patent Application No. 10-2017-7004529.

CATALYST UNIT AND EXHAUST GAS CATALYST

CROSS-REFERENCE TO RELATED APPLICATIONS

This is a U.S. national stage of application No. PCT/EP2015/001520, filed on 23 Jul. 2015, which claims priority to the German Application No. 10 2014 010 858.9, filed 25 Jul. 2014, the content of both incorporated herein by reference.

BACKGROUND OF THE INVENTION

1. Field of the Invention

The invention relates to a catalyst unit and, furthermore, relates to an exhaust gas catalytic converter.

2. Description of the Related Art

Exhaust gas catalytic converters for large engines, such as, for example, for internal combustion engines in power plants or marine diesel engines, typically include a plurality of catalyst units, wherein each catalyst unit comprises a non-metallic, in particular ceramic catalyst body constructed of fiber mats, through which exhaust gas flows, and a metallic housing, which in some instances surrounds the catalyst body. The metallic housing of the respective catalyst unit connects the respective catalyst unit to other assemblies of an exhaust gas system of the internal combustion engine in a defined manner, for example for connecting to lines conducting exhaust gas. The ceramic catalyst body of a catalyst unit, which in the case of exhaust gas catalytic converters for large engines comprises a substantially cuboid contour with a substantially rectangular inflow side and a substantially rectangular outflow side, is also called honeycomb and the housing of a catalyst unit is also described as canning. A ceramic catalyst body for a catalyst unit is fixed in the metallic housing of the catalyst unit by at least one bearing mat, which is positioned in a gap between the catalyst body and the housing of the respective catalyst unit. For stationary power plant applications, the catalyst body can be adequately fixed in the housing of the catalyst unit without further special measures by one or more bearing mats. In particular for non-stationary applications, such as, for example, for ship applications or marine applications there is the problem however that the catalyst unit is exposed to oscillations or vibrations, which can result in the catalyst body being dislodged in the respective catalyst unit or that the same is even detached from the housing of the catalyst unit. There is therefore a need for a catalyst unit, in particular for ship applications or marine applications, in which despite the load exposure through vibrations or oscillations the catalyst body of a catalyst unit can be securely held in the housing of the same without the risk of dislocating or detaching the catalyst body.

SUMMARY OF THE INVENTION

Starting out from this, it is an object of the present invention to create a new type of catalyst unit for an exhaust gas catalytic converter and an exhaust gas catalytic converter having such a catalyst unit.

This object may be achieved through a catalyst unit such as the one shown in FIG. 1. According to an aspect of the invention, the margins or edges of the catalyst body delimiting the inflow side and the outflow side each have dimensions between 210 mm and 280 mm; the gap between the margins of the catalyst body and the metallic housing seen perpendicularly to the through-flow direction of the catalyst body having a dimension determined according to the following relationship: $s \leq p*5$, wherein s is the dimension of the gap in mm, and wherein p is the dimensionless amount of the density of the, or each, bearing mat expressed in $kg/m^2$. A finding of the present invention is that through the defined dimensions of the inflow side and of the outflow side of the catalyst body, and through the defined dimensioning of the gap between the catalyst body and the housing, which is dependent on the density of the or each bearing mat, a catalyst body can be particularly advantageously received in a housing subject to forming a catalyst unit, without the risk that, as a consequence of vibration loads and oscillation loads that occur during the operation, the catalyst body is dislodged in the housing or detached from the housing of the respective catalyst unit. Here, a single catalyst body is arranged in the housing of the respective catalyst unit.

According to an advantageous further development, the dimension of the gap between the margins of the catalyst body and the metallic housing is determined according to the following specification: $s \leq p*4$, wherein the density of the, or each, bearing mat is between 0.9 $kg/m^2$ and 2.2 $kg/m^2$. Fixing the catalyst body of a catalyst unit in the housing of the catalyst unit can thereby be further improved.

According to a further advantageous further development, the housing with a cross section extending perpendicularly to the through-flow direction of the catalyst body has a substantially rectangular cross-sectional surface, wherein the margins or edges of the housing delimiting the cross-sectional surface, which run parallel to the margins or edges of the catalyst body delimiting the inflow side and the outflow side, have dimensions between 220 mm and 290 mm, wherein side walls of the housing perpendicularly to the through-flow direction of the catalyst body have a wall thickness between 0.9 mm and 2.2 mm, and wherein the dimension of the gap perpendicularly to the through-flow direction of the catalyst body amounts to a maximum of 8 mm, preferably 6 mm. Fixing the catalyst body of a catalyst unit in the housing of the catalyst unit can thereby be further improved.

According to a further advantageous further development, the housing, in the region of the inflow side and in the region of the outflow side of the catalyst body, comprises projections that at least partly close the gap between the catalyst body and the housing and that in the projection overlap the inflow side and the outflow side adjacent to the margins or edges of the catalyst body delimiting the inflow side and the outflow side. By way of these projections, fixing the catalyst body of the catalyst unit in the housing of the same can be further improved. Furthermore, these projections assume a sealing function and therefore improve the flow of exhaust gas through the catalyst body of the catalyst unit. These projections have a maximum width of 20 mm, preferably a width of 7 mm to 17 mm.

BRIEF DESCRIPTION OF THE DRAWINGS

Preferred further developments of the invention are obtained from the following description. Exemplary embodiments of the invention are explained in more detail by the drawings without being restricted to the illustrated examples. In the drawings.

DETAILED DESCRIPTION OF THE PREFERRED EMBODIMENTS

The present invention relates to a catalyst unit for an exhaust gas catalytic converter of an internal combustion engine for ship applications or marine applications and an exhaust gas catalytic converter.

In particular, the catalyst unit according to an aspect of the invention is designed as a selective catalytic reduction (SCR) catalyst unit for an SCR exhaust gas catalytic converter for a ship diesel engine.

Figure 1:
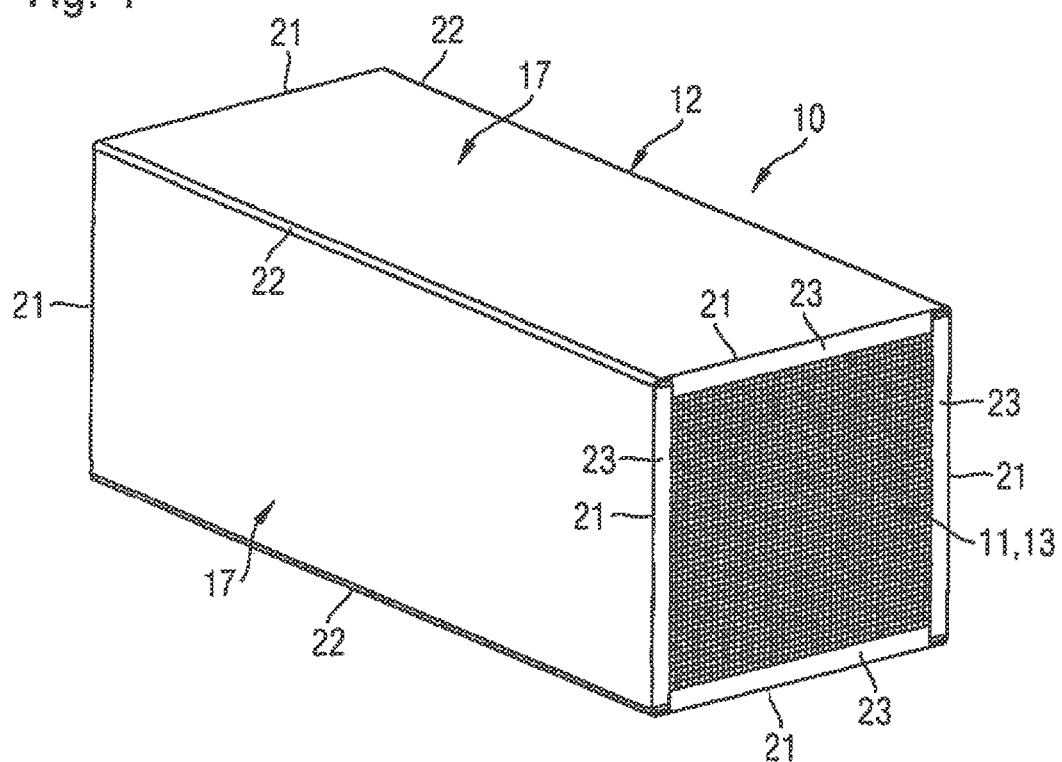
FIG. 1: is a perspective view of a catalyst unit for an exhaust gas catalytic converter according to an embodiment of the invention.
Figure 2:
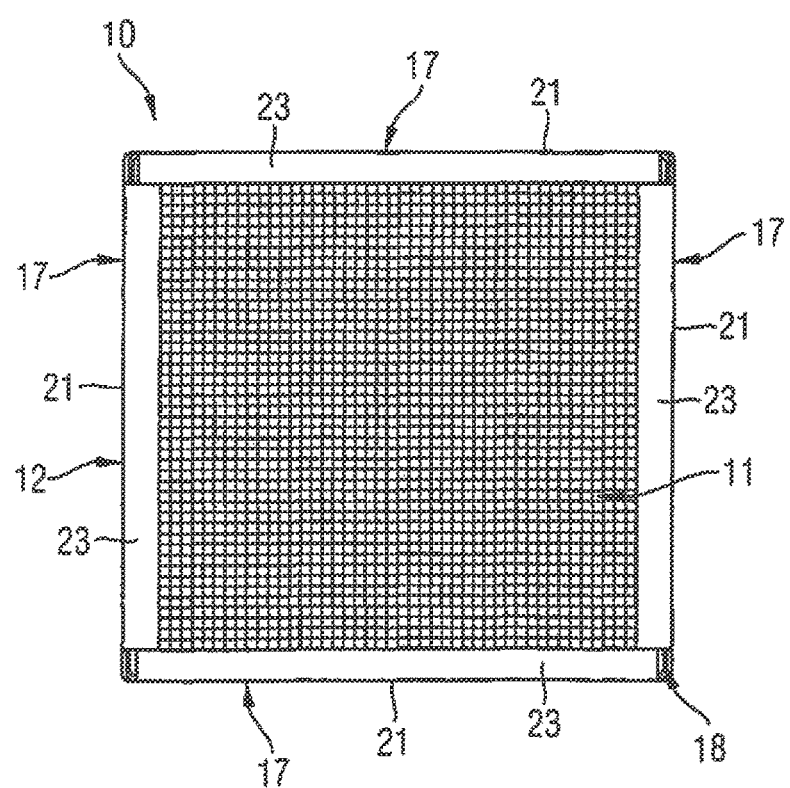
FIG. 2: is a top view of the inflow side of the catalyst unit.

FIGS. 1 and 2 show different views of a catalyst unit 10 according to an embodiment of the invention, wherein the catalyst unit 10 comprises a ceramic catalyst body 11 through which exhaust gas flows, which is arranged in a metallic housing 12. In the metallic housing 12 of the catalyst unit 10 a single ceramic catalyst body 11 is arranged.

Figure 3:
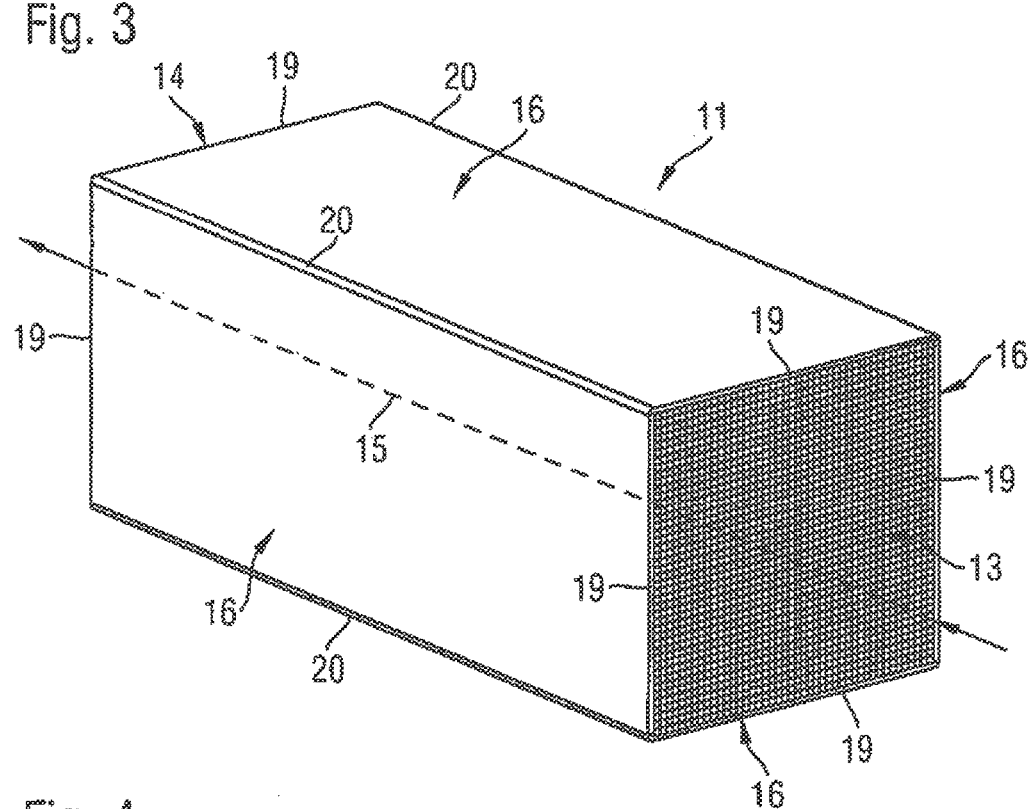
FIG. 3: is a perspective view of the catalyst body of the catalyst unit of FIGS. 1 and 2 according to an embodiment of the invention.
Figure 4:
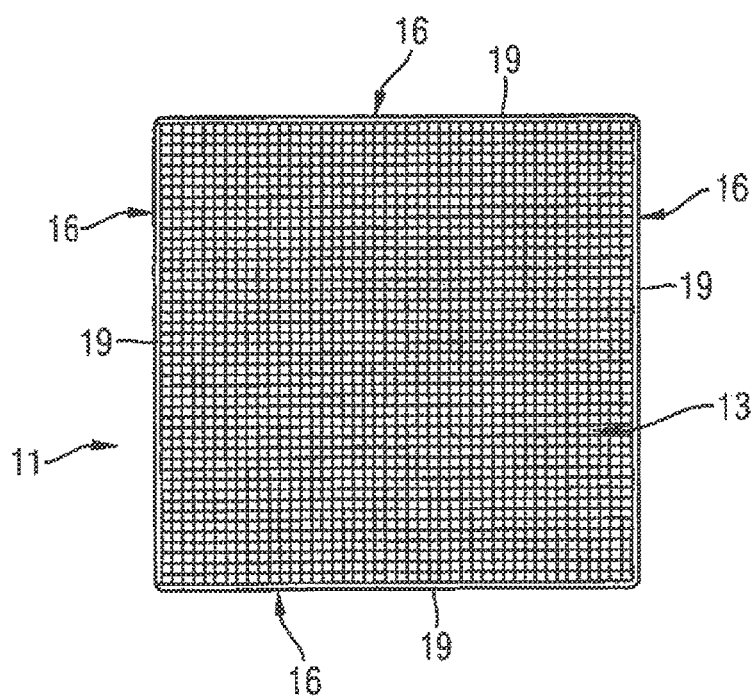
FIG. 4: is a top view of the inflow side of the catalyst body.

The catalyst body 11, which is shown alone in FIGS. 3 and 4, has a substantially cuboid contour with a substantially rectangular inflow side 13 and a likewise substantially rectangular outflow 14. Between the inflow side 13 and the outflow side 14 there extend channels through which exhaust gas flows, wherein a through-flow direction of the catalyst body 11 is visualized in FIG. 3 by an arrow 15. Closed side walls 16 of the catalyst body 11 extend between the inflow side 13 and the outflow side 14 of the catalyst body 11.

The catalyst body 11 with the substantially cuboid contour accordingly comprises four closed side walls 16 which extend between the inflow side 13 and the outflow side 14 of the catalyst body 11, wherein both the inflow side 13 and the outflow side 14, as well as the longitudinal sides 16, are substantially contoured rectangularly. The inflow side 13 and the outflow side 14 make possible exhaust gas flowing through the catalyst body 11 through the channels of the catalyst body 11 extending between the inflow side 13 and the outflow side 14. The catalyst body 11 in the region of the longitudinal sides 16 extending between the inflow side 13 and the outflow side 14 is closed.

The metallic housing 12 of the catalyst unit 10 surrounds the catalyst body 11 in some sections, namely in such a manner that the housing 12 does not negatively affect the flow of exhaust gas through the catalyst body 11.

Accordingly it is evident in particular from FIG. 1 that the housing 12 of the catalyst unit 11 comprises side walls 17 which extend parallel to the closed side walls 16 of the catalyst body 11. In the region of the inflow side 13 and of the outflow side 14 of the catalyst body 11 the housing exposes the catalyst body 11.

Between the catalyst body 11 and the housing 12 of the catalyst unit 10 a gap 18 is formed, which, seen perpendicularly to the through-flow direction of the catalyst body 11, surroundingly extends about the same so that the gap 18 is formed between all four side walls 16 of the catalyst body 11 and the adjoining side walls 17 of the housing 12 of the catalyst unit 10.

In this gap 18, at least one bearing mat 100 is positioned to fix the catalyst body 11 in the housing 12 of the catalyst unit 10.

In the case of the catalyst unit 10 according to an embodiment of the invention, the margins or edges 19 of the catalyst body 11 delimiting the inflow side 13 and the outflow side 14 each have dimensions between 210 mm and 280 mm. In particular when all four margins or edges 19 have identical dimensions, inflow side 13 and outflow side 14 are substantially contoured squarely.

The gap 18 between the catalyst body 11 and the metallic housing 12, namely the side walls 16 and 17 of catalyst body 11 and the housing 12, has a dimension seen perpendicularly to the through-flow direction 15 of the catalyst body 11 determined according to the following relationship: $s \leq p*5$, wherein s is the dimension of the gap in mm (millimeters), and wherein p is the dimensionless amount of the density expressed in $kg/m^2$ (kilogram per square meter) of the, or each, bearing mat. Preferably, the gap 1 between the catalyst body 11 and the metallic housing 12 seen perpendicularly to the through-flow direction 15 of the catalyst body 11 is dimensioned according to the following relationship: $s \leq p*4$. The density of the or each bearing mat inserted in the housing 12 for fixing the catalyst body 11 preferentially amounts to between 0.9 $kg/m^2$ and 2.2 $kg/m^2$.

The bearing mat inserted for fixing preferentially has a total fiber proportion between 50% and 70% and a vermiculite proportion between 30% and 50%. The $SiO_2$ proportion in the total fiber proportion amounts to at least 55%.

The catalyst body 11 through which exhaust gas flows has a length determined by the distance between the inflow side 13 and the outflow side 14, this length being in particular between 500 mm and 690 mm, preferably 550 mm to 660 mm, most preferably 590 mm to 630 mm. A length of margins or edges 20 of the catalyst body 11, which extend perpendicularly to the margins 19 on the inflow side 13 and the outflow side 14 accordingly lies in this range.

Preferentially, the dimension of the gap 18 defined perpendicularly to the through-flow direction 15 is identical over the entire length of the catalyst body 11. Because of tolerances of the catalyst body 11, the dimension of the gap 18 perpendicularly to the through-flow direction seen in through-flow direction however can also vary.

Particularly preferred is a catalyst unit whose margins or edges 19, which delimit the inflow side 13 and the outflow side 14, in each case have a dimension between 210 mm and 280 mm, preferably between 230 and 260 mm and the margins or edges which define the length of the catalyst body 11, a length between 500 mm and 690 mm, preferably 550 mm to 660 mm, most preferably 590 mm to 630 mm. The housing 12 then comprises margins or edges 21 which substantially extend parallel to the margins or edges 19 of the inflow side 13 and the outflow side 14 of the catalyst body 11 and have a length between 220 mm and 290 mm, preferably 240 mm to 260 mm. The margins or edges 22 of the housing 12, which run perpendicularly to the margins or edges 21 of the housing 12 and substantially parallel to the margins or edges 20 of the catalyst body 11 and determine the length of the housing 12, have a dimension between 510 mm and 710 mm, preferably between 590 mm and 630 mm.

The side walls 17 of the housing 12, seen perpendicularly to the through-flow direction of the catalyst unit 10, have a thickness between 0.9 mm and 2.2 mm.

The gap 18 defined by, or delimited by, the side walls 16 and 17 of the catalyst body 11 and of the housing 12 has a dimension, seen perpendicularly to the through-flow direction 15, of maximally 8 mm, preferably maximally 6 mm.

The housing 12 of the catalyst unit 10, which at least in some sections surrounds the catalyst body 11 of the catalyst unit 10 at least in the region of the side walls 16 of the catalyst body 11, is preferably retracted in the direction of the catalyst body 11 in order to improve the fixing of the catalyst body 11 in the housing 12. Because of this, a defined pressure between the housing 12 and the housing 11 subject to the intermediate arrangement of at least one bearing mat can be adjusted.

Seen over the length of the catalyst body 11, at least two mats are preferentially positioned in the gap 18.

If seen in through-flow direction 15 of the catalyst body 11 in sections of the gap 18 no bearing mat is positioned between the catalyst body 11 and the housing 12, it is advantageous for weight reduction to provide the housing with clearances in these sections in which no bearing mat is positioned.

In the illustrated preferred exemplary embodiment, the housing 12 comprises projections 23 in the region of the inflow side 13 and of the outflow side 14 of the catalyst body 11.

In the region of the inflow side 13, and of the outflow side 14, the projections 23 close the gap 18 between the catalyst body 11 and the housing 12 at least in some sections and overlap in the projection the inflow side 13 and the outflow side 14 of the catalyst body 11 in some sections, however only slightly so immediately adjacent to the margins or edges 19 of the inflow side 13 and outflow side 14 of the catalyst body 11. Because of this, the gap 18, in the region of the inflow side 13 and of the outflow side 14, can be sealed and furthermore the fixing of the catalyst body 11 in the housing 12 of the catalyst unit 10 can be improved. These projections 23 can be formed as folds of the side walls 17. It is possible, furthermore, to connect the metal webs providing the projections 23 to the side walls 17, for example by welding. These projections have a maximum width of 20 mm, preferably a width of 7 mm to 17 mm.

Preferentially, the catalyst body 10 has an outer wall thickness of at least 0.8 mm, preferably of at least 0.9 mm, most preferably of at least 1.0 mm in order to ensure adequate mechanical stability.

Margins or edges of the catalyst body 11 are preferentially rounded, in particular with a radius of less than 6 mm, preferably with a radius of less than 5 mm, most preferably with a radius of less than 4 mm.

An inner wall thickness of the catalyst body 11, by which the flow channels are formed, is preferably determined according to the following relationship:

$$1.75*Y^{(-0.3)} \le d_{IW} \le 1.75*Y^{(-0.4)}$$

wherein dm is the dimension of the inner wall thickness in mm (millimeters) and wherein y is the dimensionless amount of the cell density of the catalyst body 11 expressed in CHI (cells per square inch).

The density of the catalyst body 11 is in particular less than 550 kg/m$^2$, preferably less than 500 kg/m$^2$, most preferably less than 450 kg/m$^2$.

The heat expansion coefficient of the catalyst body 11 preferentially is between $5.10*10^{-6}$ 1/K and $7.0*10^{-6}$ 1/K.

The isostatic compressive strength of the catalyst body 11 is in particular at least 6 bar, preferably at least 7 bar, most preferably at least 8 bar.

The free through-flow cross section of the catalyst body 11, which is defined by the ratio of the flow cross section defined by the channels of the catalyst body 11 through which exhaust gas flows and by the total cross section of the catalyst body 11 in the region of the inflow side 13 and the outflow side 14, is at least 68%, preferably at least 70%, most preferably at least 73%.

The total weight of the catalyst unit 10 of catalyst body 11, housing 12 and at least one bearing mat is less than 40 kg, preferably less than 30 kg, most preferably less than 26 kg.

The catalyst unit 10 according to the disclosed embodiments of the invention is particularly suitable for use as a selective catalytic reduction (SCR) catalyst unit of an SCR exhaust gas catalytic converter of a diesel engine for ship applications or marine applications. However the invention is not restricted to these applications, i.e., it may also be employed in oxidation catalytic converters and particulate filters.

Even in the case when the catalyst unit 10 is exposed to vibration loads the catalyst body 11 will be securely held in the housing 12 of the catalyst unit 10. There is no risk that the catalyst body 11 is dislodged in or even detached from the housing 12.

As already mentioned, a catalyst unit 10 according to an embodiment of the invention comprises a housing 12 in which a single ceramic catalyst body 11 is positioned. Accordingly, in the case of the catalyst unit 10 according to the invention, an individual housing 12 is kept ready for each catalyst body 11 rather than a plurality of catalyst bodies being received in a housing.

An exhaust gas catalytic converter according to an embodiment of the invention comprises a plurality of such catalyst units 10.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMBERS

10 Catalyst unit
11 Catalyst body
12 Housing
13 Inflow side
14 Outflow side
15 Through-flow direction
16 Side wall
17 Side wall
18 Gap
19 Margin/edge
20 Margin/edge
21 Margin/edge
22 Margin/edge
23 Projection

The invention claimed is:
1. A catalyst unit (10) comprising:
a non-metallic catalyst body (11) through which exhaust gas flows, the non-metallic catalyst body (11) having a substantially cuboid contour with a substantially rectangular inflow side (13) and a substantially rectangular outflow side (14);

a metallic housing (12) that at least partially surrounds the non-metallic catalyst body (11); and one or more bearing mats positioned in a gap (18) between the non-metallic catalyst body (11) and the metallic housing (12), wherein the non-metallic catalyst body (11) includes margins or edges (19) delimiting the inflow side (13) and the outflow side (14), the margins or edges (19) each having dimensions between 210 mm and 280 mm, and the gap (18) between the non-metallic catalyst body (11) and the metallic housing (12), seen perpendicularly to a through-flow direction (15) of the non-metallic catalyst body (11), has a dimension determined according to the following relationship: s≤p*5, wherein s is the dimension of the gap (18) in mm, and wherein p is the dimensionless amount of a density of the bearing mat expressed in kg/m² or, in a case of a plurality of bearing mats, a mean density of the plural bearing mats.

2. The catalyst unit according to claim 1, wherein the gap (18) between the non-metallic catalyst body (11) and the metallic housing (12), seen perpendicularly to the through-flow direction (15) of the non-metallic catalyst body (11), has a dimension determined according to the following relationship: s≤p*4.

3. The catalyst unit according to claim 1, wherein the density of the, or each, bearing mat is between 0.9 kg/m² and 2.2 kg/m².

4. The catalyst unit according to claim 1, wherein the, or each, bearing mat has a total fiber proportion between 50% and 70%, with an $SiO_2$ fiber proportion of at least 55% in the total fiber proportion, and a vermiculite proportion between 30% and 50%.

5. The catalyst unit according to claim 1, wherein the metallic housing (12) has a cross section extending perpendicularly to the through-flow direction (15) of the non-metallic catalyst body (11) and has a substantially rectangular cross-sectional surface, wherein the metallic housing (12) has margins or edges (21) delimiting the cross-sectional surface, the margins or edges (21) of the metallic housing (12) running parallel to the margins or edges (19) of the non-metallic catalyst body (11) delimiting the inflow side (13) and the outflow side (14) and have dimensions between 220 mm and 290 mm, wherein side walls (17) of the metallic housing (12) perpendicular to the through-flow direction (15) of the non-metallic catalyst body (11) have a wall thickness between 0.9 mm and 2.2 mm, and wherein the dimension of the gap (18) perpendicular to the through-flow direction (15) of the non-metallic catalyst body (11) is no greater than 8 mm.

6. The catalyst unit according to claim 1, wherein the metallic housing (12), in sections in which between the metallic housing (12) and the non-metallic catalyst body (11) at least one bearing mat is positioned, is retracted in a direction of the non-metallic catalyst body (11).

7. The catalyst unit according to claim 1, wherein the metallic housing (12), in sections in which no bearing mat is positioned between the metallic housing (12) and the non-metallic catalyst body (11), comprises clearances.

8. The catalyst unit according to claim 1, wherein the metallic housing (12), in a region of the inflow side (13) and in a region of the outflow side (14) of the non-metallic catalyst body (11), comprises projections (23) configured to at least partly close the gap (18) between the non-metallic catalyst body (11) and the metallic housing (12), the projections (23) being configured to overlap the inflow side (13) and the outflow side (14) adjacent to the margins or edges (19) of the non-metallic catalyst body (11) delimiting the inflow side (13) and the outflow side (14).

9. The catalyst unit according to claim 1, wherein the non-metallic catalyst body (11):

has an outer wall thickness of at least 0.8 mm, has rounded margins or edges (19, 20) with a radius of less than 6 mm, and has an inner wall thickness determined according to the following relationship: $1.75*Y^{(-0.3)} \leq d_{IW} \leq 1.75*Y^{(-0.4)}$, wherein $d_{IW}$ is the dimension of the inner wall thickness in mm (millimeters), and wherein y is the dimensionless amount of the cell density of the non-metallic catalyst body (11) expressed in CPSI (cells per square inch).

10. The catalyst unit according to claim 1, wherein the non-metallic catalyst body (11):

has a density of less than 550 kg/m², has a heat expansion coefficient between $5.1*10^{-6}$ 1/K and $7.0*10^{-6}$ 1/K, has an isostatic compressive strength of at least 6 bar, and has a free through-flow cross section of at least 68%.

11. The catalyst unit according to claim 8, wherein the projections (23) have a width of no greater than 20 mm.

12. The catalyst unit according to claim 1, wherein the length of the catalyst body is between 500 mm and 690 mm.

13. An exhaust gas catalytic converter having a plurality of catalyst units (10) according to claim 1.

14. The catalyst unit according to claim 1, wherein the catalyst unit is a selective catalytic reduction (SCR) catalyst unit for an SCR exhaust gas catalytic converter.

15. The catalyst unit according to claim 1, wherein the non-metallic catalyst body (11) is a ceramic or fiber-containing non-metallic catalyst body (11).

* * * * *